(12) United States Patent
Rahulkumar et al.

(10) Patent No.: US 12,395,446 B2
(45) Date of Patent: Aug. 19, 2025

(54) METHOD AND SYSTEM FOR CONTROLLING REDUNDANCY FUNCTIONALITY IN A COMMUNICATION NETWORK USING TIME SENSITIVE NETWORKING

(71) Applicant: ABB Schweiz AG, Baden (CH)

(72) Inventors: D Rahulkumar, Bangalore (IN); Verma Utkarsh, Bangalore (IN); Wiese Wilhelm, Minden (DE); Kulkarni Prashant Ramchandrarao, Pune (IN); Kumark Praveen, Bangalore (IN)

(73) Assignee: ABB Schweiz AG, Baden (CH)

( * ) Notice: Subject to any disclaimer, the term of this patent is extended or adjusted under 35 U.S.C. 154(b) by 7 days.

(21) Appl. No.: 18/495,898

(22) Filed: Oct. 27, 2023

(65) Prior Publication Data

US 2024/0056398 A1 Feb. 15, 2024

Related U.S. Application Data

(63) Continuation of application No. PCT/IB2022/051309, filed on Feb. 15, 2022.

(30) Foreign Application Priority Data

Apr. 27, 2021 (IN) .............................. 202141019350

(51) Int. Cl.
*H04L 47/28* (2022.01)
*H04L 47/70* (2022.01)

(52) U.S. Cl.
CPC .............. *H04L 47/28* (2013.01); *H04L 47/82* (2013.01)

(58) Field of Classification Search
CPC ...... H04L 47/28; H04L 47/82; G06F 11/0757; G06F 11/2038; G06F 11/2048; G06F 11/2025

See application file for complete search history.

(56) References Cited

U.S. PATENT DOCUMENTS

| 2010/0138531 A1 | 6/2010 | Kashyap |
| 2011/0010560 A1 | 1/2011 | Etchegoyen |

(Continued)

FOREIGN PATENT DOCUMENTS

| WO | 2021/005400 A1 | 1/2021 |

OTHER PUBLICATIONS

European Patent Office, International Search Report in International Patent Application No. PCT/IB2022/051309, 4 pp. (Jun. 15, 2022).

(Continued)

*Primary Examiner* — Soe Hlaing
(74) *Attorney, Agent, or Firm* — Leydig, Voit & Mayer, Ltd.

(57) ABSTRACT

A system and method for controlling redundancy functionality by configuring distant located redundant modules in a communication network includes creating a redundant pair over the communication network having a TSN; defining a primary and a secondary module based on a transmission of a signal to a first and second module; causing the primary module and the secondary module to create a TSN stream configuration for communicating redundancy information between the primary and secondary module; enabling the primary module to communicate the redundancy information periodically over the TSN stream configuration to the secondary module; and triggering the secondary module to perform the function of the primary module in response to determining at least one event.

6 Claims, 3 Drawing Sheets

(56) References Cited

U.S. PATENT DOCUMENTS

2012/0151164 A1 6/2012 Nayak
2020/0259896 A1* 8/2020 Sachs ................ H04W 56/0065
2022/0360537 A1* 11/2022 Varga .................. G06F 11/2097

OTHER PUBLICATIONS

European Patent Office, Written Opinion in International Patent Application No. PCT/IB2022/051309, 8 pp. (Jun. 15, 2022).

* cited by examiner

METHOD AND SYSTEM FOR CONTROLLING REDUNDANCY FUNCTIONALITY IN A COMMUNICATION NETWORK USING TIME SENSITIVE NETWORKING

CROSS-REFERENCE TO RELATED APPLICATIONS

The instant application claims priority to International Patent Application No. PCT/IB2022/051309, filed Feb. 15, 2022, and to Indian Patent Application No. 202141019350, filed Apr. 27, 2021, each of which is incorporated herein in its entirety by reference.

FIELD OF THE DISCLOSURE

The present disclosure generally relates to configuration of redundant controllers in a communication network and, more particularly, to a method and a system for controlling redundancy functionality in a communication network by configuring distant located Redundant Modules using Time Sensitive Networking (TSN).

BACKGROUND OF THE INVENTION

Redundancy functionality in a communication network is applied for duplicating an equipment, devices, or software capable of performing identical/similar functions/operations in addition to original ones with an equivalent level of reliability.

In general, when an active component, equipment, or device fails, a duplicate or standby component, equipment, or device can take over a responsibility of the active component and continue the operation without any interruption. As the duplicate or standby component is a copy of an original component, failure of any component, equipment or device may not affect the operation of all other components in the communication network. Besides, the duplicate or standby component may have identical specifications regarding hardware or software as that of the original component. For instance, if a primary controller fails, then a standby controller/secondary controller, which has similar specification as that of the primary controller takes over the responsibility and automatically provides an uninterrupted operation/service without any initialization or user intervention.

Conventionally, both the primary and secondary controllers that is referred as a redundant pair as indicated in FIG. 1, must be co-located to share a dedicated real time redundant link. The primary controller and second controller shall act as redundant controllers to each other. However, the co-located redundant pair can be damaged together in case of a critical/hazardous situation due to fire, flood, chemicals etc. Due to this, both the primary and secondary controllers of the redundant pair may be suspended and as a result, there is an interruption occurs in an automation of the redundant controllers.

To overcome the above problem, the redundant pair must be distantly located. However, relocating the primary and secondary controllers of the redundant pair to a geographically distant location has several limitations. Since the primary and the secondary controllers are usually mounted on a common mounting base, which makes it difficult to move at distant location. In addition, existing redundant controllers, as shown in FIG. 1, require either a dedicated hardware or a dedicated communication link or both to maintain a seamless redundancy for high-availability operation of a control process. The dedicated hardware and communication link are deployed to maintain similar/identical process image in all the controller without affecting the operation performed by the controllers for example. HMI communication, IO communication etc.

BRIEF SUMMARY OF THE INVENTION

Thus, in light of the foregoing discussions, there is a need to reconfigure position of the primary and the secondary controller. The present disclosure mitigates, alleviates or eliminates one or more of the above-identified deficiencies and disadvantages in the prior art and solves at least the above-mentioned problem.

In view of the foregoing, an embodiment herein provides a first aspect of a method performed by a controller for controlling redundancy functionality by configuring distant located redundant modules in a communication network and a second aspect of a system for controlling redundancy functionality by configuring distant located redundant modules in a communication network.

According to the first aspect of an embodiment, a method performed by a controller for controlling redundancy functionality by configuring distant located redundant modules in a communication network is provided. The controller is configured to control a first module being located at a first location and a second module being located at a second location. The method comprises the steps of creating a redundant pair comprising the first module and the second module over the communication network having a Time Sensitive Network (TSN). The first module and the second module act as a redundant module to each other. The method further comprises the steps of defining a primary module and a secondary module based on a transmission of a signal to the first module and the second module. The controller defines the primary module and the secondary module upon reception of a response signal from the first module and the second module; causing the primary module and the secondary module to create a TSN stream configuration for communicating redundancy information between the primary module and the secondary module; enabling the primary module to communicate the redundancy information periodically over the TSN stream configuration to the secondary module; and triggering the secondary module to perform the function of the primary module in response to determining at least one event.

BRIEF DESCRIPTION OF THE SEVERAL VIEWS OF THE DRAWING(S)

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE INVENTION

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
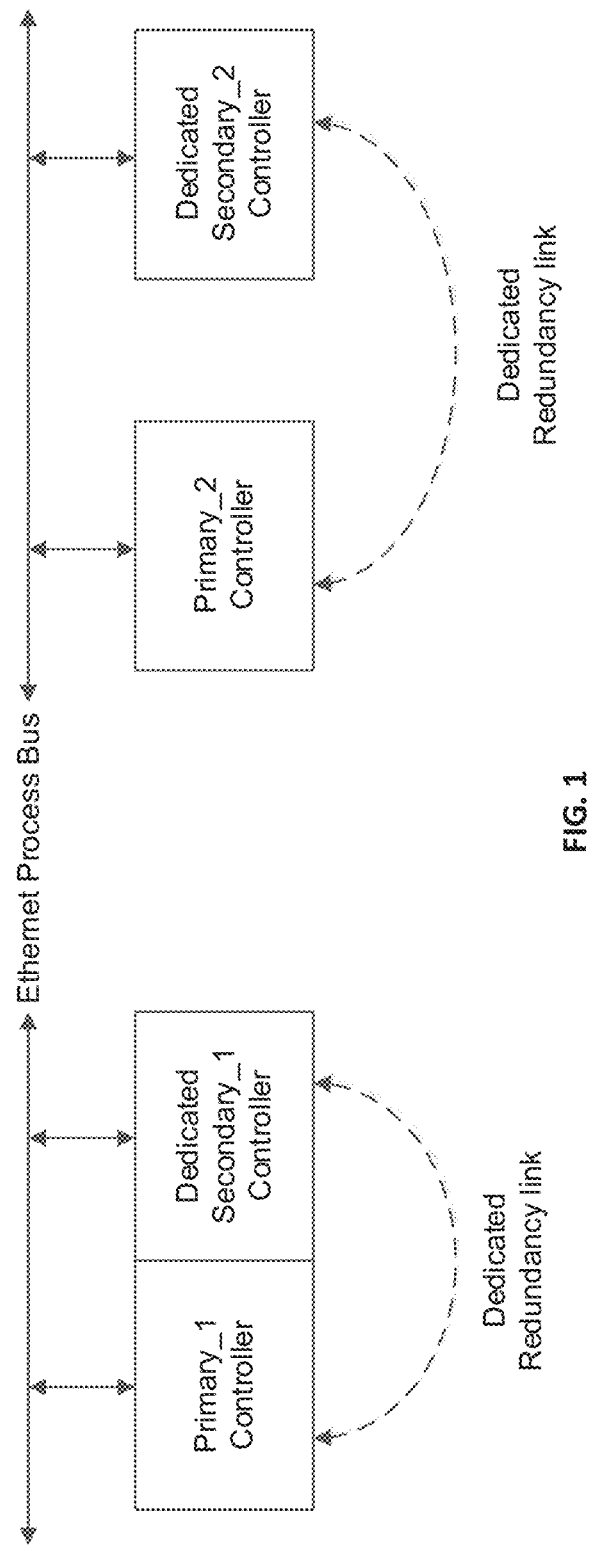
FIG. 1 is a diagram of conventional primary and secondary redundant pairs co-located to share a dedicated real time redundant link.
Figure 2:
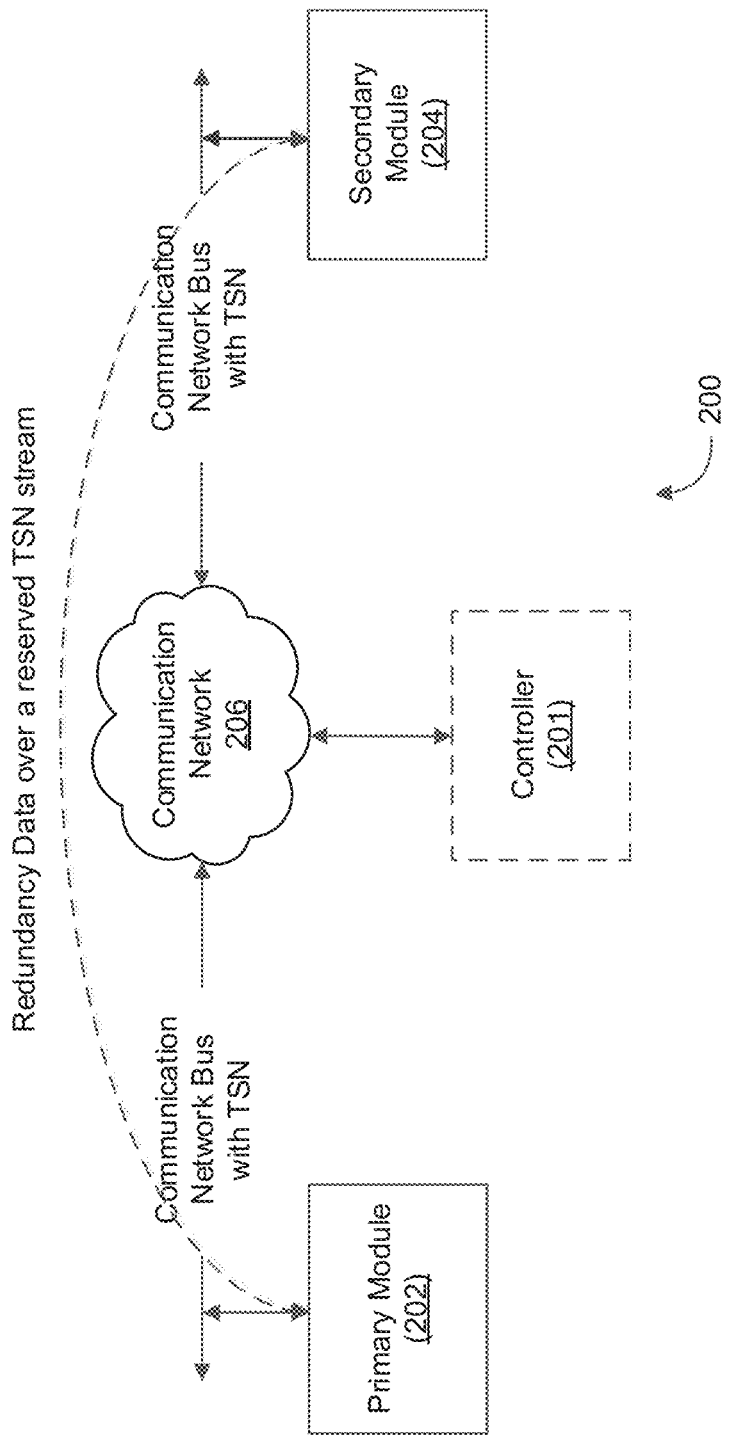
FIG. 2 is a diagram of a system for controlling redundancy functionality of distant located redundant modules in a communication network using Time Sensitive Networking (TSN) in accordance with the present disclosure.
Figure 3:
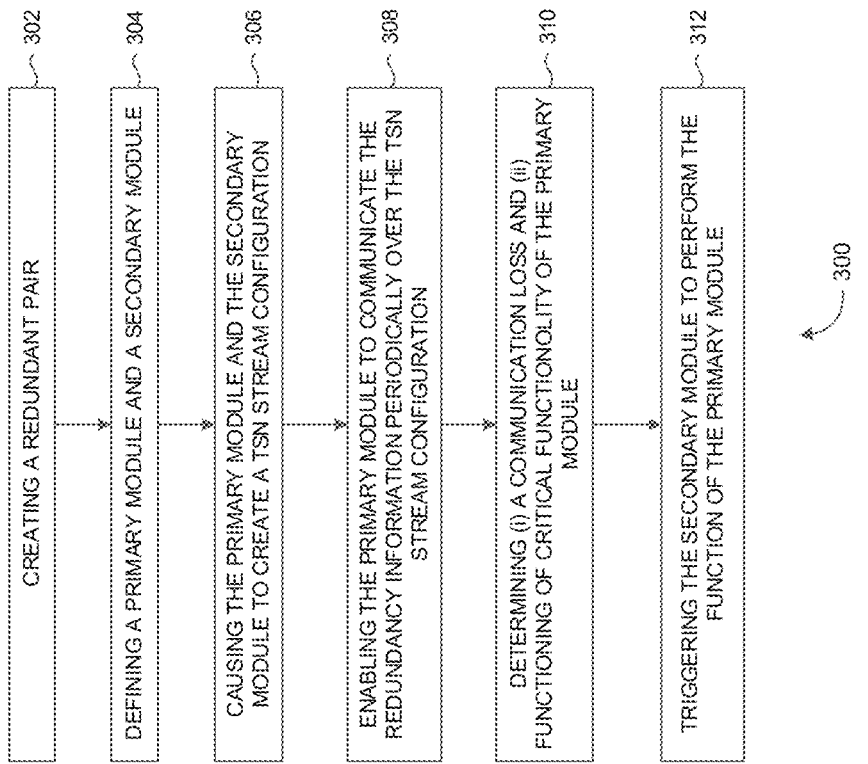
FIG. 3 is a flow diagram illustrating a method for controlling redundancy functionality of the distant located redundant modules in a communication network using Time Sensitive Networking (TSN) in accordance with the present disclosure.

As mentioned above, there is a need to place the primary and the secondary controller at geographically distant location without any requirement of a special hardware and/or via special optical fiber or parallel bus links. The embodiments herein achieve this by providing a method and a system for controlling redundancy functionality by configuring distant located redundant modules in a communication network. To implement the module redundancy, with geographically distant location of primary and secondary modules, the embodiments herein uses Time Sensitive Networking (TSN) based Ethernet technology to exchange the redundancy information between the primary and secondary modules of a redundant pair instead of a dedicated link between modules. With the capability of TSN based Ethernet technology, it is possible to locate the primary and secondary modules at geographically distant location with significantly reduce hardware and engineering effort. The controller is configured to control a first module being located at a first location and a second module being located at a second location. Referring now to the drawings, and more particularly to FIGS. 2 through 3, where similar reference characters denote corresponding features consistently throughout the figures, there are shown preferred embodiments.

FIG. 2 illustrates a system 200 for controlling redundancy functionality of distant located redundant modules in a communication network 206 using Time Sensitive Networking (TSN) according to an embodiment. The system 200 includes a controller 201, a primary module 202, a secondary module 204, and a communication network Bus with TSN. The redundancy functionality in the communication network is applied for duplicating an equipment, devices, or software capable of performing identical/similar functions/operations in addition to original ones with an equivalent level of reliability.

The controller 201 is configured to control a first module that is being located at a first location and a second module that is being located at a second location. In an embodiment, the first location and the second module are distant located from each other. In an embodiment, the second module may be remotely located at the distant location.

The controller 201 is configured to create a redundant pair comprising the first module and the second module (shown as primary and secondary module in the FIG. 2) over the communication network 206 having the Time Sensitive Network (TSN). The communication network 206 can be an Ethernet process network. The TSN is a set of IEEE 802 standards applied for Ethernet based network that makes the network deterministic by default. The TSN comprises capabilities that includes but not limited a time synchronization, scheduling, traffic shaping, selection of communication paths, path reservations and fault-tolerance.

The controller 201 is further configured to define the primary module 202 and the secondary module 204 based on a transmission of a signal to the first module and the second module. The signal may be a heartbeat signal or a beacon signal and the like. For example, the controller 201 transmit the heartbeat signal to the first module and the second module. The controller 201 defines the primary module 202 and the secondary module 204 based on a response signal received from the first module and the second module. In an embodiment, the controller 201 defines the first module as the primary module 202 if the controller 201 received the response signal from the first module quicker than the response signal received from the second module. In another embodiment, the controller 201 use the signals to identify an active status of the primary module 202 and the secondary module 204.

In yet another embodiment, the primary module 202 and the secondary module 204 are manually configured and defined during the installation stage of the redundant pair.

The controller 201 is further configured to cause the primary module 202 and the secondary module 204 to create a TSN stream configuration for communicating redundancy information between the primary module 202 and the secondary module 204. The controller 201 cause the primary module 202 to create the TSN stream configuration to communicate the redundancy information to the secondary module 204 and cause the secondary module 204 to create the TSN stream configuration to communicate the redundancy information to the primary module 202.

The controller 201 is further configured to enable the primary module 202 to communicate the redundancy information periodically over the TSN stream to the secondary module 204. The TSN stream configuration is implemented in the communication network 206 between the primary module 202 and the secondary module 204 to reserve a bandwidth to transfer the redundancy information between the primary module 202 and the secondary module 204.

In an embodiment, the redundancy information/redundant pair information comprises information to be communicated between the primary module 202 and secondary module 204 to maintain a database with updated information at both the primary module 202 and the secondary module 204. For example, the information related to a status of devices that are connected with the primary module 202. The redundancy information further comprises information being communicated between the primary module 202 and the secondary module 204 to maintain a redundancy status. For example, the information related to an active status of the primary module 202.

The controller 201 is further configured to trigger the secondary module 204 to perform the function of the primary module 202 when the secondary module 204 determines a communication loss from the primary module 202. In an embodiment, the secondary module 204 is configured to periodically check for reception of the redundancy information from the primary module 202. The communication loss will be determined when the secondary module 204 fails to receive the redundancy information from the primary module.

For example, if there is a fire accident in the first location, the primary module 202 located in the first location may got damaged due to fire accident and the secondary module 204 may experience a communication loss form the primary module 202. Then, the controller 201 may trigger the secondary module 204 to perform the function of the primary module 202 when the secondary module 204 determines and reports a communication loss from the primary module 202.

Similarly, the controller 201 is configured to trigger the secondary module 204 to perform the function of the primary module 202 when the secondary module 204 determines that critical functionality of the primary module 202 is stopped functioning. The secondary module 204 is configured to determine that the critical functionality of the primary module 202 is stopped functioning when the redundancy information from the primary module 202 is not received at the secondary module 204 within the specified time. The critical functionality may be controlling of one or more devices.

For example, the primary module 202 may control one or more devices connected to the primary module 202. Due to some reasons, the critical functionality (controlling of the one or more devices) of the primary module 202 stopped working, and the primary module 202 fails to transmit the redundancy information to the secondary module 204. The secondary module 204 may identify that the critical functionality of the primary module 202 has been stopped and the controller 201 triggers the secondary module 204 to perform the function of the primary module 202.

In an embodiment, during configuration of the primary module 202 and the secondary module 204, the redundancy information and information about the TSN network made available to both the primary module 202 and the secondary module 204. The TSN Talker information (either the primary module 202 or secondary module 204 act as a transmitter or TSN talker) comprises destination MAC address, VLAN priority, and VLAN ID and the TSN Listener information (either the primary 202 or secondary module 204 act as a receiver or TSN listener) comprises destination MAC address, VLAN ID, and VLAN tag information.

In an embodiment, the controller 201 is a processor or a software module. In another embodiment, the controller 201 can be configured at the primary module 202 and the secondary module 204. In yet another embodiment, the controller 201 can be a switch or a Programmable Logic Controller, PLC/Supervisory Control and Data Acquisition, SCADA based control unit configured at both the primary module 202 and the secondary module 204.

FIG. 3 is a flow diagram illustrating a method 300 for controlling redundancy functionality of distant located redundant modules in a communication network using Time Sensitive Networking (TSN) according to an embodiment. The method 300 that is illustrated in FIG. 3, as a collection of operations in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be deleted from the methods without departing from the scope of the subject matter described herein. In the context of software, the operations represent computer instructions that, when executed by one or more processors, perform the recited operations.

At step 302, the method 300 comprises creating 201 the redundant pair comprising the first module and the second module over the communication network 206 having the Time Sensitive Network (TSN). The first module and the second module act as a redundant module to each other. At step 304, the method 300 comprises defining a primary module 202 and a secondary module 204 based on a transmission of a signal to the first module and the second module. The method 300 comprises defining the primary module 202 and the secondary module 204 upon reception of a response signal from the first module and the second module. At step 306, the method 300 comprises causing the primary module 202 and the secondary module 204 to create a TSN stream configuration for communicating redundancy information between the primary module 202 and the secondary module 204.

At step 308, the method 300 comprises enabling the primary module 202 to communicate the redundancy information periodically over the TSN stream configuration to the secondary module 204. At step 310, the method 300 comprises allowing the secondary module to determine at least one of (i) a communication loss from the primary module to the secondary module and (ii) functioning of a critical functionality of the primary module. At step 312, the method 300 comprises triggering the secondary module 204 to perform the function of the primary module 202 when the communication loss from the primary module 202 to the secondary module 204 is determined and/or when determining the critical functionality of the primary module 202 is stopped functioning.

In an embodiment, the redundancy information/redundant pair information comprises information to be communicated between the primary module 202 and secondary module 204 to maintain a database with updated information at both the primary module 202 and the secondary module 204. For example, the information related to a status of devices that are connected with the primary module 202. The redundancy information further comprises information being communicated between the primary module 202 and the secondary module 204 to maintain a redundancy status. For example, the information related to an active status of the primary module 202.

The present invention reduces/eliminate a requirement of a specially designed hardware and a dedicated redundancy link. Further, the present invention improves reliability of the system at hazardous place or critical location. In addition, the method can be implemented for any control system that requires redundancy pairing of devices.

The foregoing description of the specific embodiments will so fully reveal the general nature of the embodiments herein that a person skilled in the art can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

According to an embodiment, the step of triggering the secondary module to perform the function of the primary module in response to determining at least one event comprises: determining, by the secondary module, a communication loss from the primary module to the secondary module. The communication loss is determined by checking, at a predefined time interval, the periodic communication of redundancy information from the primary module.

According to an embodiment, the step of triggering the secondary module to perform the function of the primary module in response to determining at least one event comprises determining, by the secondary module, that critical functionality of the primary module is stopped functioning. The secondary module determines that the critical functionality of the primary module is stopped functioning when the redundancy information from the primary module is not received at the secondary module within the specified time.

According to an embodiment, the redundancy information comprises information to be communicated between the primary module and secondary module to maintain a database and information being communicated between the modules to maintain a redundancy status.

According to an embodiment, the TSN is implemented in the communication network between the primary module and the secondary module to reserve a bandwidth to transfer the redundancy information between the primary module and the secondary module.

According to an embodiment, the step of causing comprises causing, by the controller, the primary module to create the TSN stream configuration to communicate the redundancy information to the secondary module. The step of causing further comprises causing, by the controller, the secondary module to create the TSN stream configuration to communicate the redundancy information to the primary module when the secondary module performs the function of the primary module.

According to the second aspect there is provided a system for controlling redundancy functionality by configuring distant located redundant modules in a communication network. The system comprises a controller that is configured to control: a first module that is being located at a first location; and a second module that is being located at a second location. The controller is configured to create a redundant pair comprising the first module and the second module over the communication network having a Time Sensitive Network. The first module and the second module act as a redundant module to each other. The controller is configured to define a primary module and a secondary module based on a transmission of a signal to the first module and the second module. The controller defines the primary module and the secondary module upon reception of a response signal from the first module and the second module. The controller is further configured to cause the primary module and the secondary module to create a TSN stream configuration for communicating redundancy information between the primary module and the secondary module. The controller is further configured to enable the primary module to communicate the redundancy information periodically over the TSN stream to the secondary module and trigger the secondary module to perform the function of the primary module in response to determining at least one event.

According to an embodiment, the secondary module is triggered to perform the function of the primary module in response to determining at least one event comprises: determining, by the secondary module, a communication loss from the primary module to the secondary module. The communication loss is determined by checking, at a predefined time interval, the periodic communication of redundancy information from the primary module.

According to an embodiment, the secondary module is triggered to perform the function of the primary module in response to determining at least one event comprises: determining, by the secondary module, that critical functionality of the primary module is stopped functioning. The secondary module determines that the critical functionality of the primary module is stopped functioning when the redundancy information from the primary module is not received at the secondary module within the specified time.

According to an embodiment, the TSN is implemented in the communication network between the primary module and the secondary module to reserve a bandwidth to transfer the redundancy information between the primary module and the secondary module.

Effects and features of the second aspects are to a large extent analogous to those described above in connection with the first aspect. Embodiments mentioned in relation to the first aspect are largely compatible with the second aspect.

Hence, it is to be understood that the herein disclosed disclosure is not limited to the particular component parts of the device described or steps of the methods described since such device and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The present disclosure will become apparent from the detailed description given below. These and other aspects of the embodiments and other objects and advantages of the present invention herein will be better appreciated and understood when considered in conjunction with the following description and the accompanying drawings. The accompanying drawings are incorporated for illustration of preferred embodiments of the present invention and are not intended to limit the scope thereof. It should be understood, however, that the following descriptions, while indicating preferred embodiments and numerous specific details thereof, are given by way of illustration and not of limitation. Different configuration changes and modifications may be made within the scope of the embodiments herein without departing from the spirit thereof, and the embodiments herein include all such modifications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method performed by a controller for controlling redundancy functionality by configuring distant located Redundant Modules in a communication network, wherein the controller is configured to control a first module being located at a first location and a second module being located at a second location, the method performed by the controller comprising:
    creating a redundant pair comprising the first module and the second module over the communication network having a Time Sensitive Network (TSN), wherein the first module and the second module act as a redundant module to each other;
    defining a primary module and a secondary module based on a transmission of a signal to the first module and to the second module;
    causing the primary module and the secondary module to create a TSN stream configuration for communicating redundancy information between the primary module and the secondary module;
    enabling the primary module to communicate the redundancy information periodically over the TSN stream configuration to the secondary module; and
    triggering the secondary module to perform the function of the primary module in response to determining at least one event, where the at least one event comprises one or more of:
        determining by the secondary module a communication loss from the primary module to the secondary module by checking, at a predefined time interval, the periodic communication of redundancy information from the primary module; and
        determining by the secondary module that critical functionality of the primary module is stopped functioning when the redundancy information from the primary module is not received at the secondary module within the specified time.

2. The method of claim 1, wherein the redundancy information comprises information to be communicated between the primary module and the secondary module to maintain a database and information being communicated between the primary module and the secondary module to maintain a redundancy status.

3. The method of claim 1, wherein the TSN is implemented in the communication network between the primary module and the secondary module to reserve a bandwidth to transfer the redundancy information between the primary module and the secondary module.

4. The method of claim 1, wherein causing the primary module and the secondary module to create a TSN stream configuration for communicating redundancy information between the primary module and the secondary module comprises:
    causing, by the controller, the primary module to create the TSN stream configuration to communicate the redundancy information to the secondary module, and
    causing, by the controller, the secondary module to create the TSN stream configuration to communicate the redundancy information to the primary module when the secondary module performs the function of the primary module.

5. A system for controlling redundancy functionality by configuring distant located Redundant Modules in a communication network, wherein the system comprises:
    a controller that is configured to control a first module that is being located at a first location, and a second module that is being located at a second location:
    wherein the controller configured to:
    create a redundant pair comprising the first module and the second module over the communication network having a Time Sensitive Network (TSN), wherein the first module and the second module act as a redundant module to each other;
    define a primary module and a secondary module based on a transmission of a signal to the first module and the second module, wherein the controller defines the primary module and the secondary module upon reception of a response signal from the first module and the second module;
    cause the primary module and the secondary module to create a TSN stream configuration for communicating redundancy information between the primary module and the secondary module;
    enable the primary module to communicate the redundancy information periodically over the TSN stream to the secondary module; and
    trigger the secondary module to perform the function of the primary module in response to determining at least one event, wherein the at least one event comprises one or more of:
        determining, by the secondary module, a communication loss from the primary module to the secondary module by checking, at a predefined time interval, the periodic communication of redundancy information from the primary module; and
        determining, by the secondary module, that critical functionality of the primary module is stopped functioning when the redundancy information from the primary module is not received at the secondary module within the specified time.

6. The system of claim 5, wherein the TSN is implemented in the communication network between the primary module and the secondary module to reserve a bandwidth to transfer the redundancy information between the primary module and the secondary module.

* * * * *